United States Patent [19]

Mack

[11] Patent Number: 4,633,463

[45] Date of Patent: Dec. 30, 1986

[54] RADIO COMMUNICATION SYSTEM

[75] Inventor: Alfred Mack, Little Silver, N.J.

[73] Assignee: Canadian Marconi Corporation, Montreal, Calif.X

[21] Appl. No.: 594,113

[22] Filed: Mar. 28, 1984

[51] Int. Cl.⁴ .......................... H04J 3/16; H04Q 7/00; H04B 1/00

[52] U.S. Cl. ....................................... 370/95; 455/33; 455/56

[58] Field of Search ....................... 370/95; 455/33, 53, 455/54, 56

[56] References Cited

U.S. PATENT DOCUMENTS

| | | | |
|---|---|---|---|
| 2,234,244 | 3/1941 | Gossel | 250/11 |
| 2,685,642 | 8/1954 | Vallarino et al. | 250/6 |
| 3,314,051 | 4/1967 | Willcox et al. | 340/122.5 |
| 3,328,698 | 6/1967 | Schreder | 325/304 |
| 3,529,243 | 9/1970 | Reindl | 325/55 |
| 3,671,865 | 6/1972 | Szumila | 325/58 |
| 3,761,822 | 9/1973 | Richardson et al. | 325/301 |
| 3,764,915 | 10/1973 | Cox et al. | 325/53 |
| 3,870,955 | 3/1975 | Ouvrier | 325/2 |
| 3,913,017 | 10/1975 | Imaseki | 325/52 |
| 3,925,782 | 12/1975 | Anderl et al. | 343/178 |
| 4,112,257 | 9/1978 | Frost | 179/2 EB |
| 4,125,808 | 11/1978 | Graham | 179/2 EB |
| 4,140,973 | 2/1979 | Stevens | 325/67 |
| 4,144,496 | 3/1979 | Cunningham et al. | 179/2 EB |
| 4,152,647 | 5/1979 | Gladden et al. | 179/2 EB |
| 4,197,500 | 4/1980 | Klein et al. | 455/62 |
| 4,308,429 | 12/1981 | Kai et al. | 455/33 |
| 4,308,613 | 12/1981 | Chasek | 370/94 |
| 4,317,218 | 2/1982 | Perry | 455/54 |
| 4,365,347 | 12/1982 | Otsuka et al. | 455/33 |
| 4,369,520 | 1/1983 | Cerny, Jr. et al. | 455/137 |
| 4,392,242 | 6/1983 | Kai | 455/56 |
| 4,399,555 | 8/1983 | MacDonald et al. | 455/56 |
| 4,414,661 | 11/1983 | Karlstrom | 370/100 |
| 4,434,506 | 2/1984 | Fujiwara et al. | 455/53 |
| 4,549,293 | 10/1985 | Christian et al. | 370/104 |

Primary Examiner—Douglas W. Olms
Assistant Examiner—Frank M. Scutch, III
Attorney, Agent, or Firm—Robin, Blecker & Daley

[57] ABSTRACT

A communication system, adapted particularly for use in military tactical situations, includes a plurality of central stations and at least one remote station assigned to each such central station. Each central station includes an omnidirectional antenna and each remote station includes a directional antenna, directed toward the central station to which the remote station is assigned. Each central station transmits at a distinct frequency and each remote station assigned thereto receives at the frequency of its assigned central station and transmits at a different frequency, unique to itself. Transmission qualities between central stations is evaluated to optimize communication paths between remote stations.

10 Claims, 11 Drawing Figures

RADIO COMMUNICATION SYSTEM

FIELD OF THE INVENTION

This invention relates generally to systems and methods for radio communication and pertains more particularly to establishing communication links among a plurality of military units in a tactical situation.

BACKGROUND OF THE INVENTION

Present day communication networks for tactical situations typically include directional communication links extending from individual military sites, which will be called remote stations, and retransmitting stations, which will be called central stations. Further directional links, called trunk groups, exist as between each pair of central stations within communication reach of each other. A representative of such system is shown in U.S. Pat. No. 4,125,808 which issued to L. H. Graham on Nov. 14, 1978. As will be seen in FIGS. 1 and 2 of this patent, remote stations are denominated BCU (basic communication unit) and the central stations are denominated RTU (retransmission unit). Directional links are found in the system of the '808 patent as between each BCU and its assigned RTU and other directional links (trunk groups 10-24) exist among the RTUs. Each of links 10-24 is comprised of a multi-channel radio link or trunk group, each trunk being at a unique frequency. Each central station includes a switching center, such as the customary AN/TTC-39 Line Circuit Switch, which functions to assign trunks individually to telephone conversations between the participating BCUs.

In operation of the system of '808 patent, the communication path between BCU's assigned to different RTU's is established by an inquiry transmission by the assigned RTU to all RTU's to which it is directionally connected as to whether the desired BCU is assigned to such RTU's. If the answer to the inquiry is affirmative, the path is established. If the answer is negative, each RTU inquired of retransmits the inquiry to those RTU's with which they are in directional communication.

In the '808 system, some effort is directed at monitoring transmission quality. As is shown in FIG. 3(b) of the '808 patent, its system includes a signal-to-noise detector which, in the course of channel selection, advises a channel selector of the signal-to-noise ratio on a channel being considered for use. Should the ratio be unacceptable, the selector advances to a different channel for like signal-to-noise inquiry.

While one finds in systems such as the '808 patent system an adaptiveness to changing radio connectivity conditions, such as the loss of a retransmission unit or a poor transmission quality condition on a given channel, these benefits are obtained with a system architecture which undesirably is highly frequency involved and depends vastly upon directional communication and trunk assignment on a central-to-central basis. Thus, each RTU broadcasts in multi-frequency transmissions and requires plural directional antennas. The probabilities are accordingly heightened for interference and setup and redeployment times can be excessive for mobile combat situations.

SUMMARY OF THE INVENTION

The present invention has as its primary object the provision of radio communication architecture enhancing and simplifying communication between retmote stations in such as the exemplary tactical military situation.

More particular objects of the invention are to provide improved transmission quality monitoring and adaptiveness in a communication system itself having improved set up time as against the types of systems above discussed.

In attaining the foregoing and other objects, the invention provides a communication system, adapted particularly for use in military tactical situations, comprising a plurality of central stations and at least one remote station assigned to each such central station. Each central station includes an omnidirectional antenna and each remote station includes a directional antenna, directed toward the central station to which the remote station is assigned. Each central station transmits at a distinct frequency and each remote station assigned thereto receives at the frequency of its assigned central station and transmits at a different frequency, unique to itself.

Each central station has capability for transmitting, omnidirectionally, a transmission quality evaluation signal, and includes receivers operating at the frequencies of the other system central stations and its own remote stations. Each central station also includes a received signal quality evaluator, which identifies, on the basis of the quality of the outputs of its central station receivers for other central stations, those other central stations with which it is in communication and the quality of such intercommunication in preselected levels.

The participating central stations exchange such transmission quality indications, whereby each central station is apprised of the transmission and reception communication capabilities of the system. Each central station includes a switching subsystem advised by its quality evaluator of the central station transmission capabilities such that the switching subsystem may establish communication trunks through the central stations for effecting communication between its assigned remote stations and all other remote station in the overall communication system.

All central stations broadcast a time division multiplexed (TDM) group inclusive of a time slot which is a common coordinating channel and other time slots assignable, as desired, to individual remote-to-remote telephone communications. This is in effect, a "TDM highway" common to all central stations, in contrast to the plural trunk usage of such as the '808 patent system above discussed. Thus, the switching system, which in previous systems effected trunk assignments on a central to central link basis, herein functions to assign time slots on the TDM highway from each central station on a circular broadcast zone basis.

The foregoing and other objects and features of the invention will be further evident from the following detailed description of the preferred embodiment of the invention and practices therein and thereunder and from the drawings wherein like references numeral identify like parts throughout.

DESCRIPTION OF PREFERRED EMBODIMENTS AND PRACTICES

Figure 1:
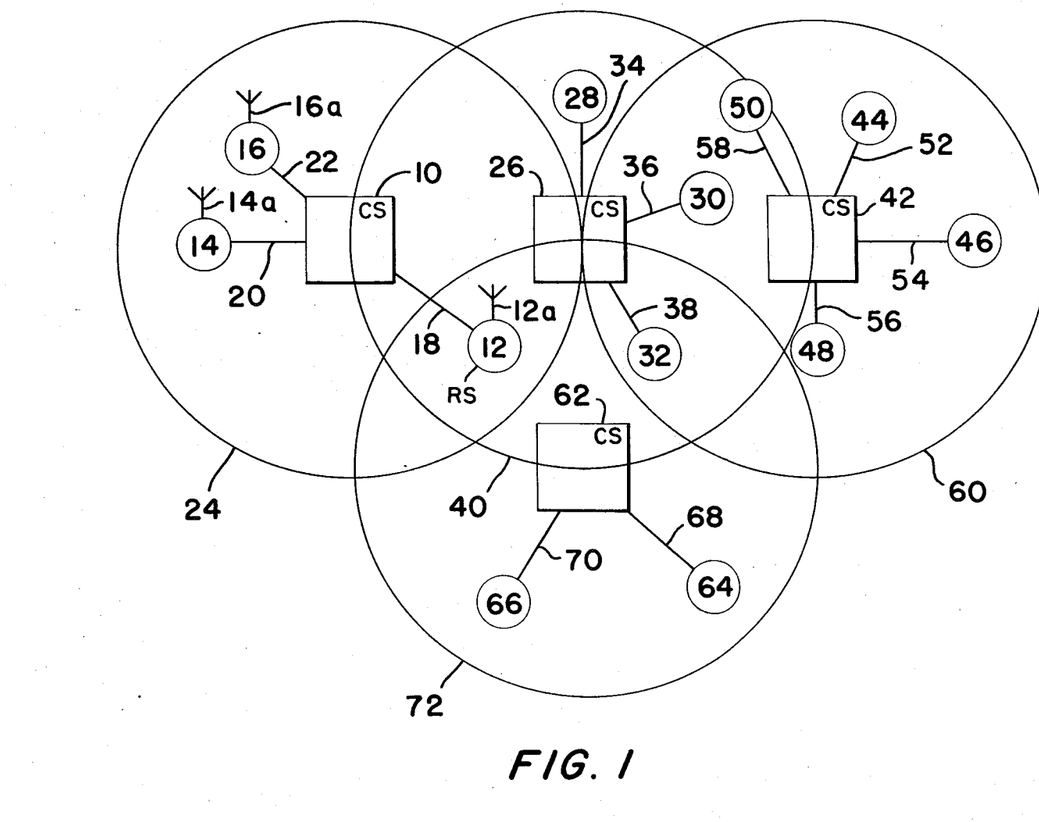
FIG. 1 is a diagram illustrative of a typical system in accordance with the invention.

Referring to FIG. 1, central station 10 includes an omnidirectional antenna 10a and has three remote stations (RS) assigned thereto 12, 14 and 16. Stations 12–16 each include a directional antenna (12a, 14a and 16a) establishing communication links 18, 20 and 22 with central station 10, which completes such links with its omnidirectional antenna. The circle 24 identifies the operating transmission range for central station 10.

Three other central stations are illustrated in FIG. 1, shown at 26, 42 and 62. Central station 26 has remote stations 28, 30 and 32 assigned thereto and links 34, 36 and 38 are established. The zone of communication for central station 26 is indicated at 40. Central station Unit 42 has remote stations 44, 46, 48 and 50 assigned thereto and links 52, 54, 56 and 58 are established. The zone of communication for central station 42 is indicated at 60. Central station 62 has remote stations 64 and 66 assigned thereto and links 68 and 70 are established. The zone of communication for central station 62 is indicated at 72.

Figure 2:
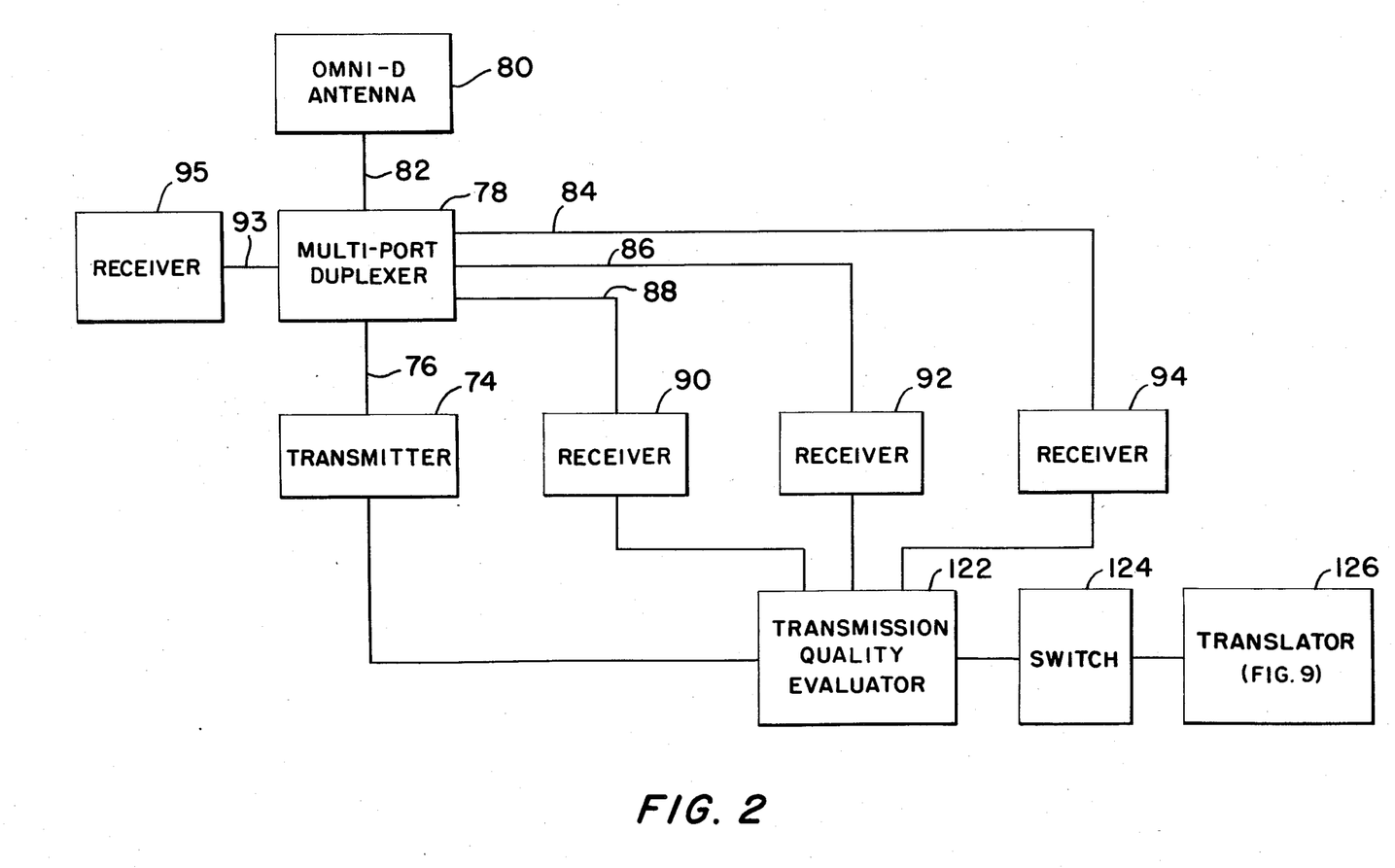
FIG. 2 is a block diagram of each central station of the Fig. system.

The configuration of each central station is shown in FIG. 2. The central station transmitter for central station 10, namely, unit 74 applies its output over line 76 to multi-port duplexer 78 which in turn drives omnidirectional antenna 80 over line 82. The received ouput signals of duplexer 78, comprising transmissions received by central station 10 from other central stations or its own remote stations, are applied by lines 84, 86 and 88, to receivers 90, 92 and 94. Duplexer output line 93 feeds receiver 95, shown to illustrate a typical receiver for a remote station of the central station of FIG. 2.

Each participating central station is assigned a distinct operating frequency and receivers 90, 92 and 94 are tuned respectively to the transmission frequencies assigned to central stations 26, 42 and 62. In initial setup, and at other predetermined times following setup, each central station broadcasts a signal for inquiry as to other central stations within its transmission region. Upon receipt of each central station of such inquiry signal, it broadcasts indication as to its reception thereof. In the particularly illustrated system configuration of FIG. 1, receiver 90 will provide an acknowledgment of receipt of the inquiry of central station 26. Receivers 92 and 94 will not provide such output indication, since they are outside of the transmission range of central station 10 and do not receive the central station 10 inquiry.

Considering central station 26, during setup, its counterpart receivers tuned to the frequencies assigned to central stations 10, 42 and 62 will each provide output indication since central stations 10, 42 and 62 are all within transmission region 40.

In the case of central station 42, during setup, its counterpart receivers tuned to the frequencies assigned to central station 26 will provide output indication since that central station is within transmission region 60. The receivers at central station tuned to the frequencies of central stations 10 and 62 will not provide such output indication, since they are outside of transmission region 60. In the case of central station 62, during setup, its receivers tuned to the frequencies assigned to other central stations will have the same output condition as noted for central station 42.

For the configuration of FIG. 1, this phase of system setup would yield the following tables for radio connectivity, central-to-central.

| —  | 10 | 26 | 42 | 62 |
|----|----|----|----|----|
| 10 | —  | Y  | N  | N  |
| 26 | Y  | —  | Y  | Y  |
| 42 | N  | Y  | —  | N  |
| 62 | N  | Y  | N  | —  |

Figure 3:
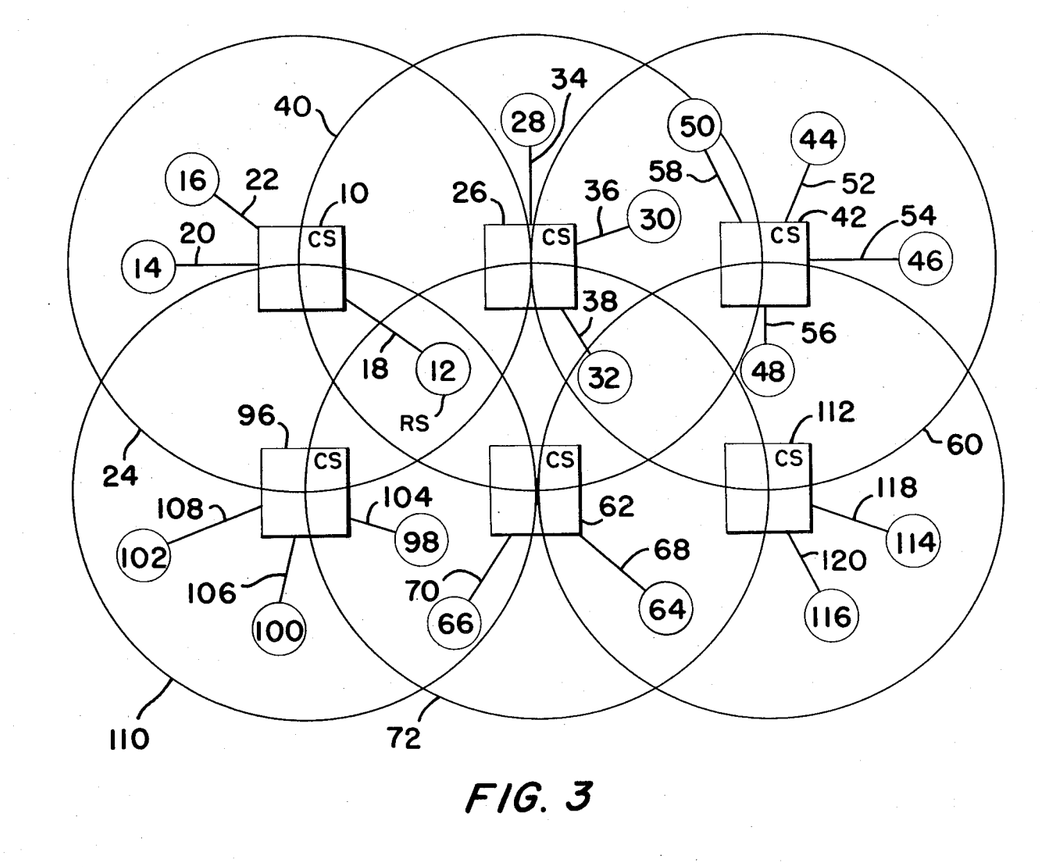
FIG. 3 is a diagram of the FIG. 1 system expanded to include two additional central stations.

The next phase of system set up entails determination of the quality of the radio links usable for linking the central stations. While alternate choices of links are not present in the simplistic configuration of FIG. 1, same are present as the system is expanded to include central station 96 and 112, as shown in FIG. 3. Here, central station 96 has remote stations 98, 100 and 102 connected thereto over directional links 104, 106 and 108. Transmission range is shown at 110. Central station 112 has remote stations 114 and 116 assigned thereto and the system includes directional links 118 and 120 therefor. The radio connectivity table for this configuration, central-to-central is shown in the following table.

| —   | 10 | 26 | 42 | 62 | 96 | 112 |
|-----|----|----|----|----|----|-----|
| 10  | —  | Y  | N  | N  | Y  | N   |
| 26  | Y  | —  | Y  | Y  | N  | N   |
| 42  | N  | Y  | —  | N  | N  | Y   |
| 62  | N  | Y  | N  | —  | Y  | Y   |
| 96  | Y  | N  | N  | Y  | —  | N   |
| 112 | N  | N  | Y  | Y  | N  | —   |

For example, remote station 46 can communicate with remote station 100 over central-central links 42-26-10-96, link 42-112-62-96, and others.

Radio connectivity quality is evaluated in quality determining unit 122 of FIG. 2, which may be a microprocessor programmed in accordance with the program flow chart of FIGS. 4–7, to be discussed below. On the basis of such quality determination, at each central station and exchange thereof among all central stations, a link quality table is established at each central station in its switch 124, which may be a commercially available unit, such as the AN/TTC-39 "150 Line Circuit Switch" of the Communication Systems Division of GTE Systems, which may be manually operated responsive to the information furnished by quality determining unit 122 or suitably dynamically set on the basis of such information.

Figure 9:
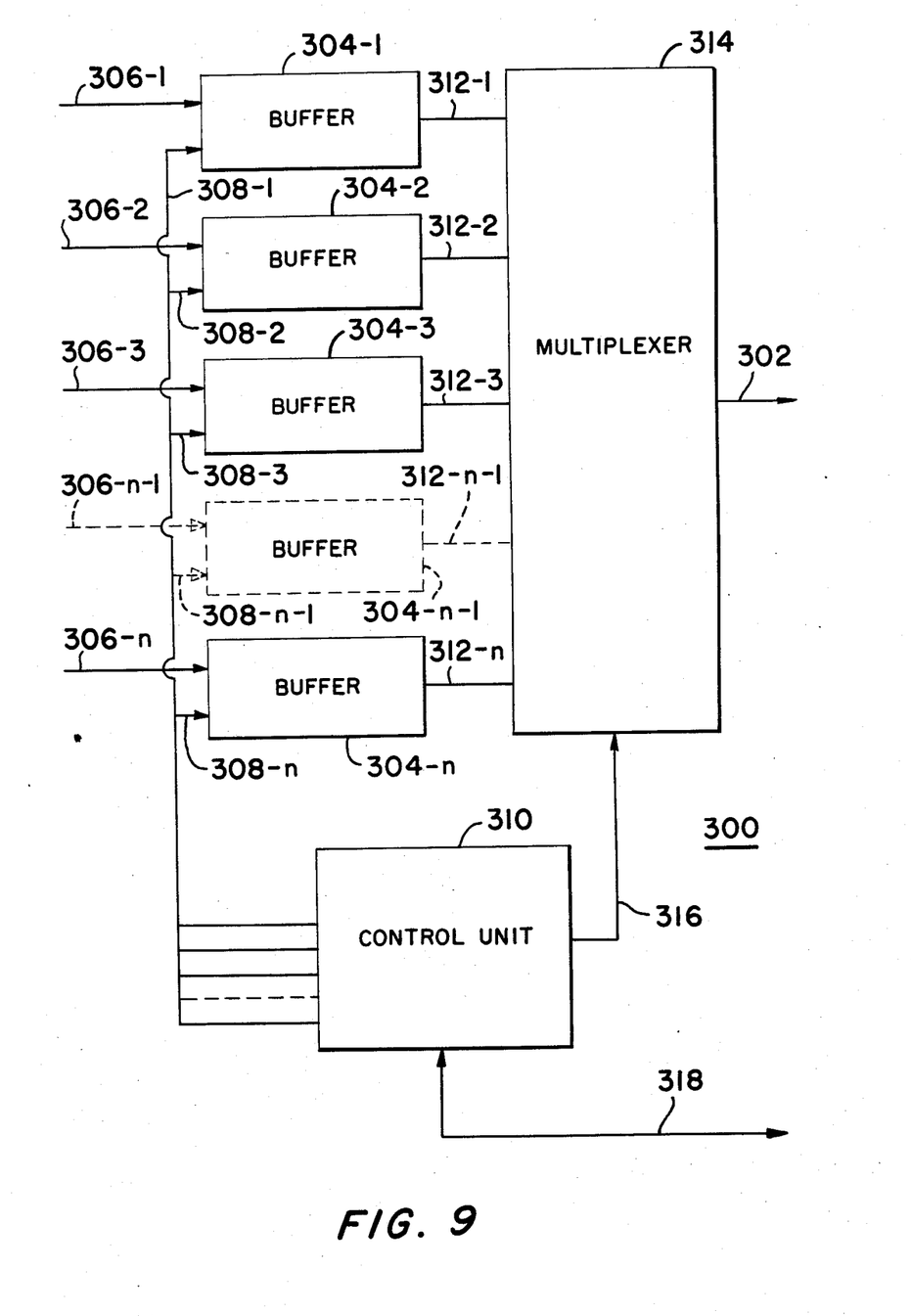
FIGS. 9 and 10 are block diagrams of the directionalomnidirectional-directional translator of the FIG. 2 central station.
Figure 10:
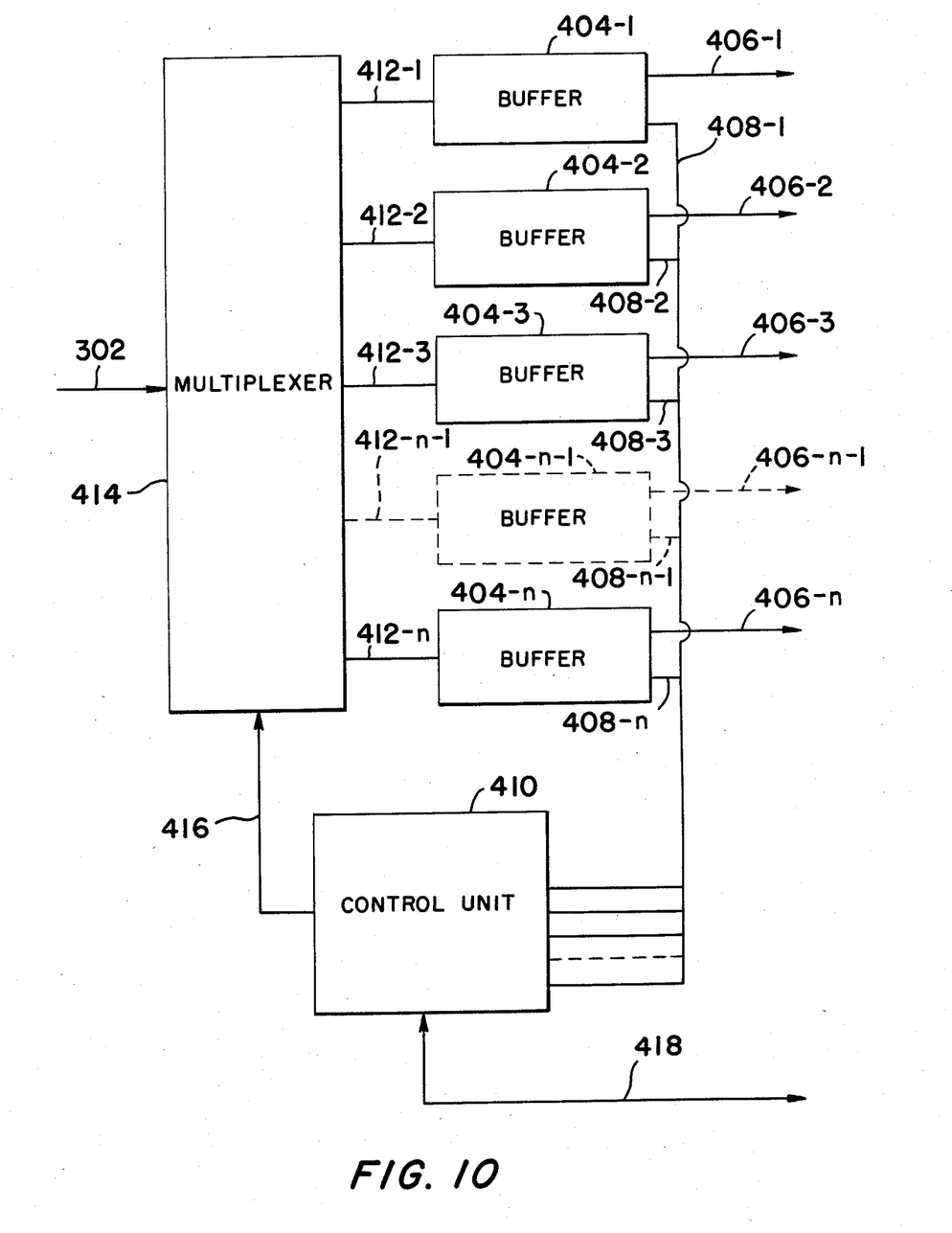

The output signals of switch 124 of FIG. 2 are applied to translator 126, an embodiment of which is shown in FIGS. 9 and 10 and discussed below.

In evaluating radio link quality, an initialization phase occurs during setup and also on the occasion of any new central station joining a pre-existing network. Thereafter, a steady state phase occurs. In both phases, individual information packets are transmitted which are in format providing Frame Check Sequence (FCS) failure information as the indication of a successively or unsuccessfully transmitted or received packet. The method used is to convert the received error information into bits and compare it with a reference Bit Error Rate (BER) in terms of standard units.

During initialization, the reference BER is chosen to be the reciprocal of the total number of bits sent, same being the optimal value with which to measure changes in the error rate and corresponding to the center of the normal distribution. $10^4$ bits (one hundred packets with one hundred bits each) will be sent during initialization, with a reference BER of $10^{-4}$.

For a BER of $10^{-4}$, the expected or mean number of successful bits and the standard deviation for ten thousand bits (using the binomial distribution) are:

$$\mu = np = (10000)(0.9999) = 9999$$

$$\mu = np = (10000)(.9999) = 9999$$

$$\sigma = \sqrt{npq} = (10000)(.9999)/10000$$

where n is sample size (in bits); p is probability of success; and q is probability of failure.

Once the expected value is known, it is compared to the actually received amount in terms of standard units. The standard unit, Z, is defined as:

$$Z = (X-np)/\sqrt{npq} \text{ or }$$

$$Z = (X-\mu)/\sigma$$

$$Z = (X-\mu)/\sigma$$

where X is the number of successful trials in the sample.

By way of example, assuming that five bit errors occurred in ten thousand bits, the standard unit would be:

$$Z = (X-\mu)/\sigma = (9995-9999)/0.99995 = -4$$

The following table of Z values can be created for different values of incorrect packets and BER's for a low noise environment.

| Incorrect Packets | Bits Incorrect (Assumed) | Bits Correct (Assumed) | Z |
| --- | --- | --- | --- |
| 0 | 0 | 10K/10K | 1 |
| 1 | 1 | 9999/10K | 0 |
| 2 | 2 | 9998/10K | -1 |
| 3 | 3 | 9997/10K | -2 |

The Z value will be seen to have a linear relationship to the number of incorrect packets, thus in essence representing the number of incorrect bits that have been received.

| BER | Success Rate | Z |
| --- | --- | --- |
| $10^{-4}$ | 9999/10K | 0 |
| $10^{-3}$ | 9990/10K | -9 |
| $10^{-2}$ | 9980/10K | -99 |
| $10^{-4}$ | 9000/10K | -999 |

From this, the following condition codes dependent on the value of Z may be established.

| Z | Condition | BER |
| --- | --- | --- |
| Z > 5* | Excellent | |
| 0 < Z < 5* | Good | $10^{-4} <$ BER |
| -9 < Z < 0 | Marginal | $10^{-4} <$ BER $< 10^{-4}$ |
| Z < -9 | Bad | BER $< 10^{-3}$ |

The asterisked value for Z, namely, five, is only for purposes of the steady state phase, where Z is incremented to, as is discussed in detail below in connection with the flow charts of FIGS. 4–7. During initialization, the highest possible value for Z is unity, i.e., all one hundred packets (ten thousand bits) are correct.

The received data are with respect to packets, not bits. Thus a conversion has to be made. Given a packet is successful, it can be assumed that all of its bits are correct. However, where a packet is successful, there could be anywhere from one to a hundred errors, given that the packet has one hundred bits, a quite complex determination. To assume that there are one hundred errors per unsuccessful packet would greatly underestimate the actual error rate if the errors were simply caused by a random noise pulse. Similarly, to assume that there is only one error for each unsuccessful packet would over estimate the path condition if the path were actually bad.

The approach used herein is to assume that there is only one error in every unsuccessful packet in a low noise environment. For this purpose, a low noise environment could be defined as realizing a BER less than the reciprocal of the packet size, i.e., $10^{-2}$ for a one hundred bit packet size. However, with one bit packets, a BER of $10^{-2}$ would correspond to every packet being received being in error. One would not know if the errors were due to just random errors or an active threat. Setting the threshold at $10^{-3}$ would correspond to approximately one out of ten packets being in error. The maximum possible variation would then be from $10^{-3}$ (one bit error in the ten packets) to $10^{-1}$ (one hundred bit errors in ten packets). This is seen as a conservative threshold, assuming only random errors. As discussed below, this is seen as an appropriate threshold, since burst errors are to be considered.

As soon as the threshold is crossed, it is no longer assumed that the errors are due to random noise pulses. The approach is now to assume that there is more than one error per unsuccessful packet. How much more is dependent upon the condition of the path under consideration at that time. If the path is established as good, the probability that an incorrect packet contains a large number of incorrect bits is very small. Similarly, if the path has already been established as bad, the probability that an incorrect packet contains a large number of incorrect bits is greater. The practice, generalized to this point, will be understood in detail by reference now to FIGS. 4–7 and the flow charts therein.

Figure 4:
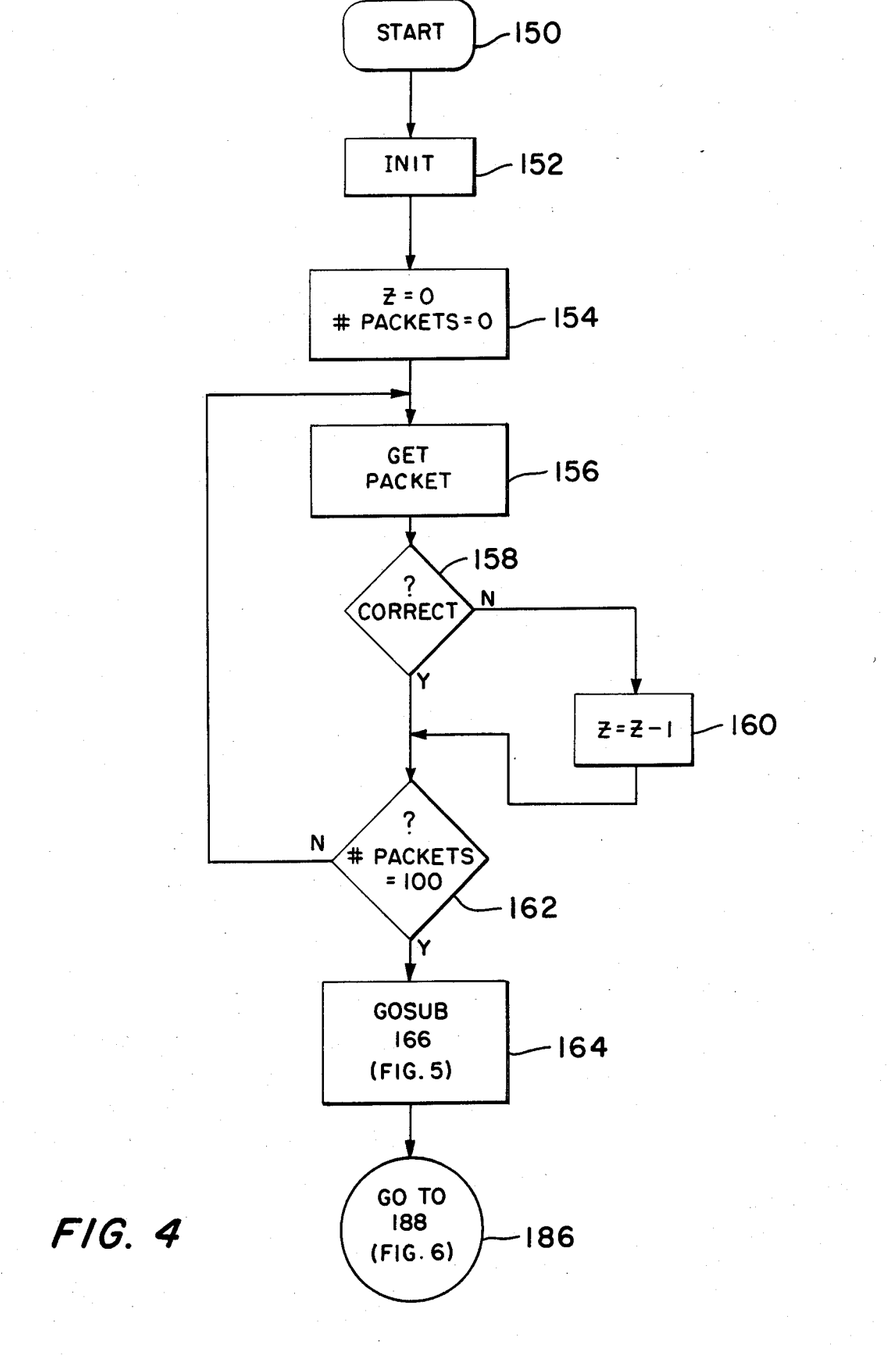
FIGS. 4 through 7 are flow charts of the operation of the transmission quality evaluator of the FIG. 2 central station.
Figure 5:
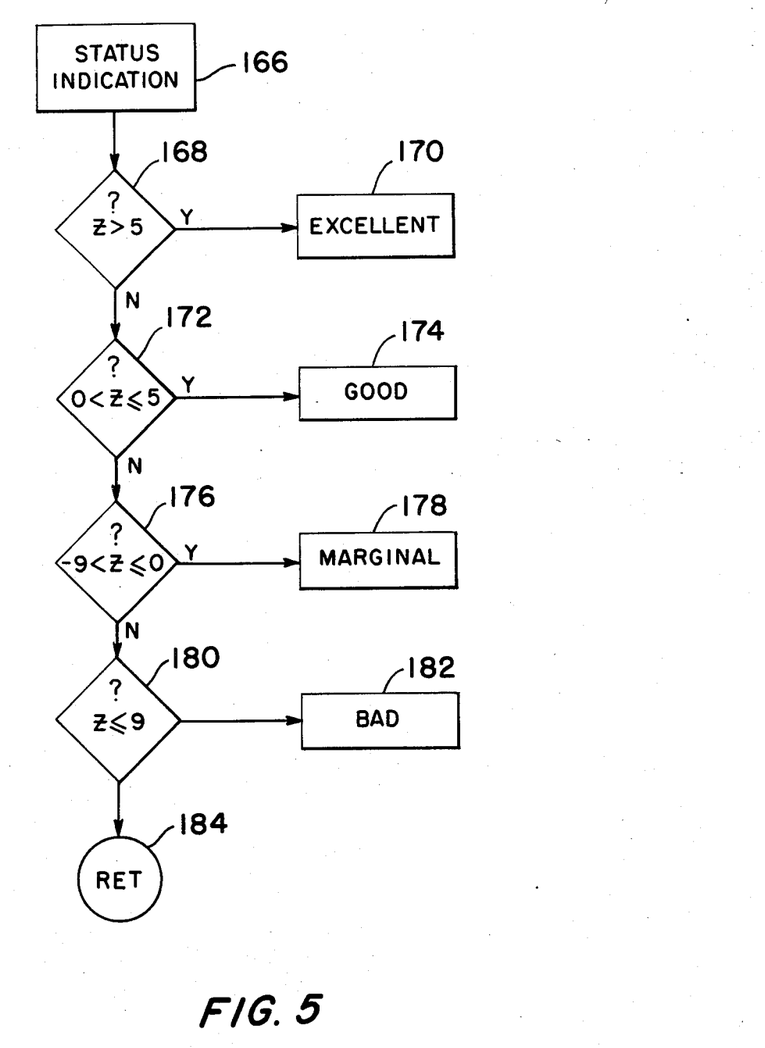

FIGS. 4 and 5 show the practice for the intialization phase. Step 150 and 152 are the entries to this practice. In step 154, Z and X (the number of packets) are set to zero. In step 156, an individual packet is received and in step 158 inquiry is made as to whether the packet is correct. If the inquiry is answered in the negative, Z is decremented by unity in step 160. Z is unchanged if the inquiry is answered in the affirmative. In either event, the program procedes to step 162, inquiry is made as to whether the number of packets received and examined has reached the total of one hundred. If the inquiry is answered in the negative, the next packet is obtained in step 156 and the practice described is repeated. If the inquiry in step 162 is answered in the affirmative, the program proceeds to step 164 and the subroutine called out therein and shown in FIG. 5.

The FIG. 5 subroutine includes entry step 166 and inquiry is made in step 168 as to whether the value of Z following the initial one hundred packet examination is greater than five. For initialization, this condition cannot occur, as noted above. Accordingly, step 170 (which sets path quality as excellent) is not practiced and the program proceeds to step 172 and inquiry is made as to whether Z has a value of between zero and five. If the inquiry is answered in the affirmative, path quality is set to good in step 174. If the inquiry is answered in the negative, the program proceeds to step 176 where inquiry is made as to whether the value of Z is between negative nine and zero. If the inquiry is answered in the affirmative, path quality is set to marginal in step 178. If the inquiry is answered in the negative, the program proceeds to step 180 where inquiry is made as to whether the value of Z is less (more negative) than nine. if the inquiry is answered in the affirmative, path quality is set to bad in step 182. Following this establishing of a figure of merit for the path under consideration at initialization, a return occurs in step 184 and one proceeds through steps 186 of FIG. 4 and 188 of FIG. 6 to enter the steady state phase.

Figure 6:
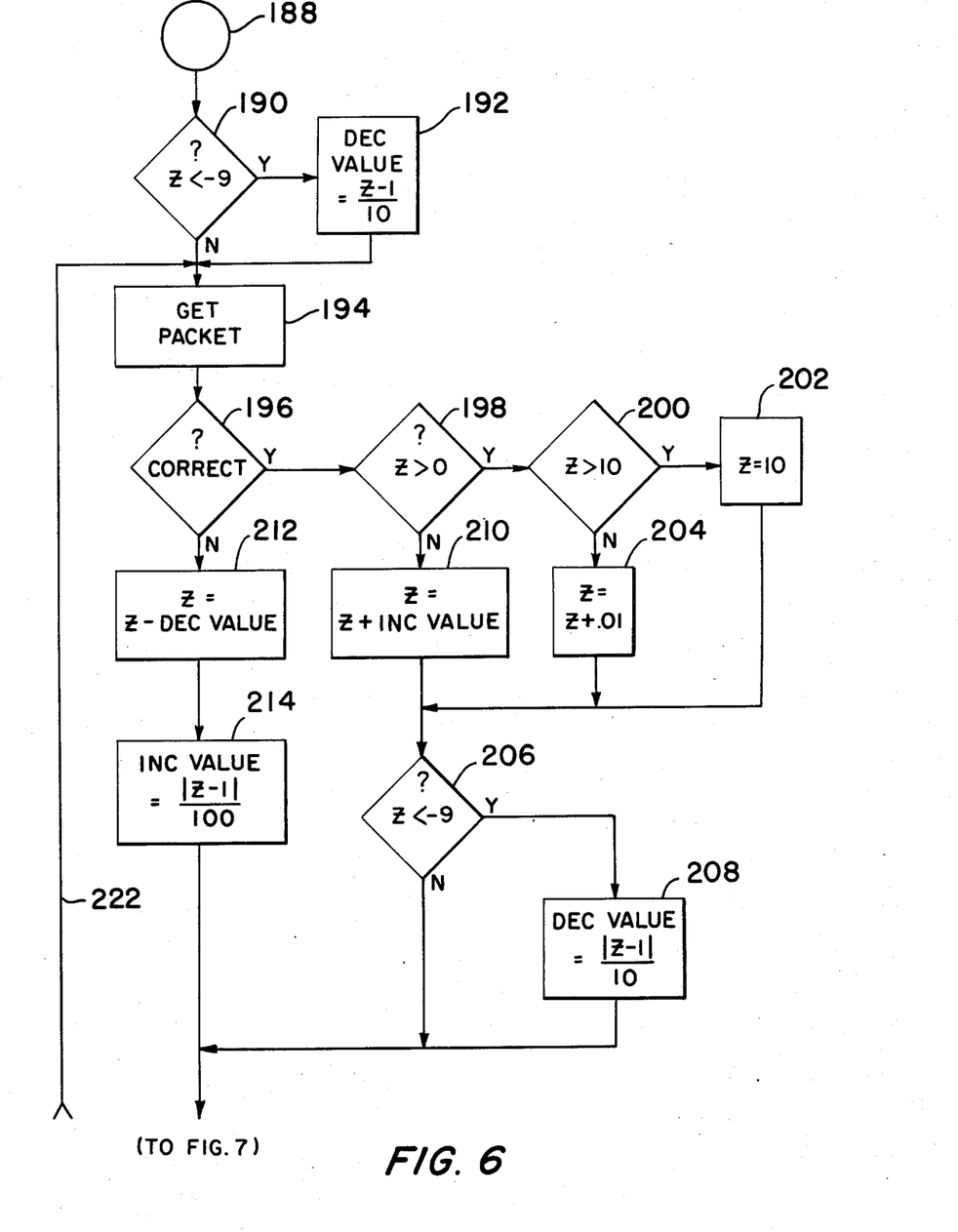

Inquiry is made in step 190 as to whether the value of Z is less than minus nine. If the inquiry is answered in the affirmative, a pre-existing Z decrement value is set in step 192 to the present value of Z less one and divided by ten. At this point, or directly from step 190 if the inquiry in step 192 is answered in the negative, a packet is obtained in step 194. Inquiry is made in step 196 as to whether the packet is error-free. Assuming the affirmative answer here, the program proceeds to step 198 inquiry is made as to whether Z exceeds zero. Again assuming the affirmative answer, the program inquires in step 200 as to whether Z exceeds ten. If yes, step 202 limits the value of Z to its maximum of ten.

If the answer to the step 200 inquiry is no, the program proceeds to step 204, where Z is incremented by the increment value of one one-hundredth. The program proceeds to step 206 inquiry is made as to whether Z is less than minus nine. If the inquiry is answered in the affirmative, Z is decremented in step 208 by one-tenth of the absolute value of Z minus unity. If the inquiry is answered in the negative, the program proceeds to FIG. 7, as it also does in the alternative following practice of step 208.

Prior to discussing FIG. 7, the remaining steps of FIG. 6 will be discussed. If the inquiry in step 198 were answered in the negative, the program would have stepped to step 206 after practice of step 210, wherein Z is incremented by the value of one one-hundredth of the total of the absolute value of Z less unity. If the inquiry in step 196 were answered in the negative, the program would have stepped to step 212 wherein Z is decremented by the decrement value established in step 192 and then to step 214 where Z is incremented by the value of one one-hundredth of the total of the absolute value of Z less unity.

Figure 7:
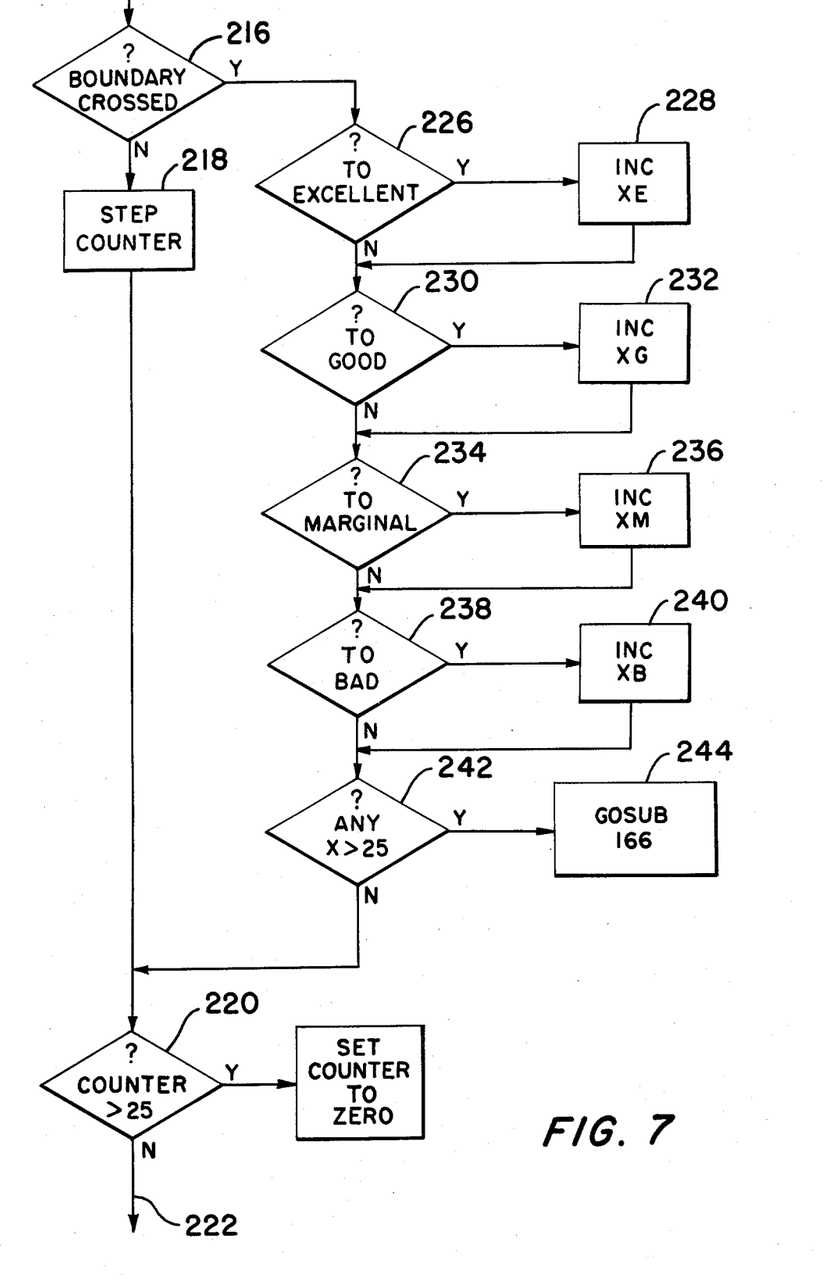

Turning to FIG. 7, following the practice of any of steps 206, 208 and 214 of FIG. 6, step 216 is practiced. Here, inquiry is made as to whether the current value of Z has moved in classification among excellent, good, marginal or bad, i.e., has Z crossed a boundary. If the inquiry is answered in the negative, the program proceeds to step 218, wherein a counter is stepped in count. Inquiry is now made in step 220 as to whether the count of such counter is greater than twenty-five. If no, the program follows line 222 back to FIG. 6 to repeat the practice above described. If yes, the counter is zeroed by step 224 prior to following line 222.

Where the step 216 inquiry is answered in the affirmative, i.e., that a boundary has been crossed, the program proceeds to step 226 wherein inquiry is made as to whether the boundary crossing is into the excellent area. If the inquiry is answered in the affirmative, a counter specific to this activity is stepped in count in step 228. Steps 230 and 232 perform likewise for crossing into the good category. Steps 234 and 236 perform likewise for crossing into the marginal category. Steps 238 and 240 perform likewise for crossing into the good category. In step 242, inquiry is made as to whether any of the XE, XG, XM or XB counters exceed a count of twenty-five. If yes, the subroutine of FIG. 5 is called for in step 244 and practiced to update the path quality status. On return, or if the inquiry in step 242 is answered in the negative, the program proceeds to step 220.

Considering the initialization phase program of FIG. 4 in terms of function, one hundred received packets are examined. Z is set to zero at the outset i.e., the path under evaluation is assumed to be at the marginal-to-good boundary. If there is no decrementing of Z during the evaluation, the path is logged in by the FIG. 5 subroutine as good at the outset of the steady state phase.

During initialization, on each occurrence of an error-ridden received packet, is decremented by unity. For example, if between one and nine errors are detected during initialization, Z is reduced from zero to the corresponding negative numeric value and the path enters the steady state phase with marginal quality.

In the steady state phase, actual intelligence transmissions are examined for errors. While not shown in the depicted software, the system herein is so implemented that quality test transmissions are generated in adequate number for continued path quality monitoring in the event that there are insufficient actual intelligence transmissions during a given time period.

Considering the steady state phase, step 188 involves settling a first decrement value of one-tenth for Z. Should the incoming Z value be less than minus nine (the path is marginal to bad at the outset), the first decrement is accordingly greater (step 192). The effect of this is to accelerate indication of path quality degradation if the path is initially of low quality. This decrementing of Z, on each error-ridden packet, occurs in step 212. Incrementing takes place in Z under this condition also (step 214), but at a losing rate to the decrementing under this condition. Z incrementing takes place at path condition adaptive values in the event of a successful receipt of a packet, in steps off the affirmative answer to the step 196 inquiry (in steps 210 and 204), but decrementing of Z nevertheless attends successful packets in step 208.

Updating of path quality undergoes scrutiny in the steady state activity of FIG. 7. Upon indication in step 216 of a boundary crossing, one of steps 226, 230, 234, or 238 will step its associated counter in steps 228, 232, 236 or 240. Assuming the boundary crossing to be from good to marginal, the counter of step 236 is advanced by one count. If this activity repeats twenty-five more times, step 242 calls up the FIG. 5, subroutine and path quality indication is changed from its prior good status to marginal in step 176 of FIG. 5.

If, after such initial boundary crossing, the counter of step 236 does not reach a count of twenty-six in the course of a predetermined number of received packets, the counter of step 236 is set to zero and path quality status remains at good. This predetermined number of received packets is established in step 220 of FIG. 7 as twenty-five.

By way of example, assume that five successively received packets each involve a crossing of the boundary from good to marginal. This places the step 236 counter at a count of five.

Now, assume that the next twenty-six received packets do not involve the boundary crossing. For each of these letter packets, the inquiry in step 216 is answered in the negative and the counter of step 218 is stepped. The twenty-sixth of these latter packets gives rise to clearing the counters of steps 236 and 218 to zero count.

As will be seen from the above example, the system ignores, from a path quality status change viewpoint, temporary path quality degradation and does not change path quality status until the system is satisfied that the degradation is of too long a temporal extent.

Figure 8:
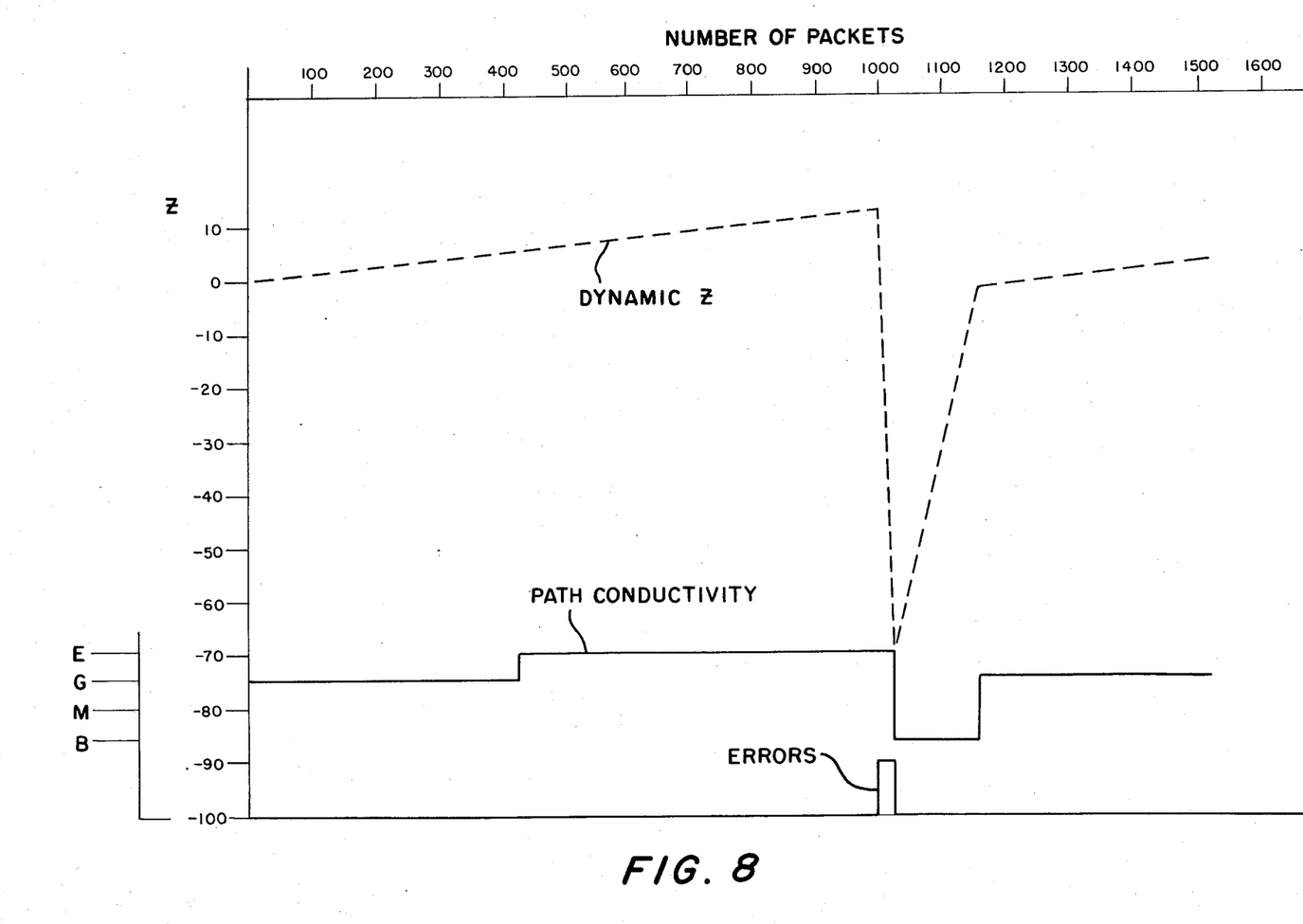
FIG. 8 is a diagram illustrative of the operation of the transmission quality evaluator of the FIG. 2 central station.

Referring to FIG. 8, another example of system performance is seen. At system initialization, Z is at zero and packets are received successfully up to approximately one thousand packets. Z has then reached its limit of ten. Path quality status has stepped from its initial good (G) status to excellent (E). ERRORS occur in packets received at this juncture. Z decreases very rapidly in the face of these continuing errors for the program of FIGS. 6 and 7 and path quality status drops quickly to poor. At the end of the Z rises to zero in accelerating manner, path quality status changing from bad to good. The initalization phase now repeats at somewhat after the eleven hundredth packet reception.

Referring to FIG. 9, each central station includes a transmission translator 300 for applying to output TDM highway 302, transmissions of its remote stations to others, and transmissions of other central stations received for retransmission to other central stations. Buffers 304-1 through 304-n receive these intended transmission data on input lines 306-1 through 306-n. Lines 308-1 through 308-n provide timing and control as between transmission control unit and buffers 304-1 through 304-n.

The outputs of buffers 304-1 through 304-n are applied over lines 312-1 through 312-n to multiplexer 314, which receives control signals directing its multiplexing activity from TDM control unit 310 over line 316.

Referring to FIG. 10, each central station also includes a reception translator 400 for receiving from output TDM highway 402, transmissions to its remote stations from others, and transmissions of other central stations received for retransmission to other central stations. Buffers 404-1 through 404-n output these received transmission data on output lines 406-1 through 406-n. Lines 408-1 through 408-n providing timing and control as between the buffers and TDM control unit 410. the buffer contents and furnish same to TDM reception control unit 410.

The inputs to buffers 404-1 through 404-n are derived over lines 412-1 through 412-n from multiplexer 414, which receives control signals directing its multiplexing activity from TDM reception control unit 410 over line 416.

Figure 11:
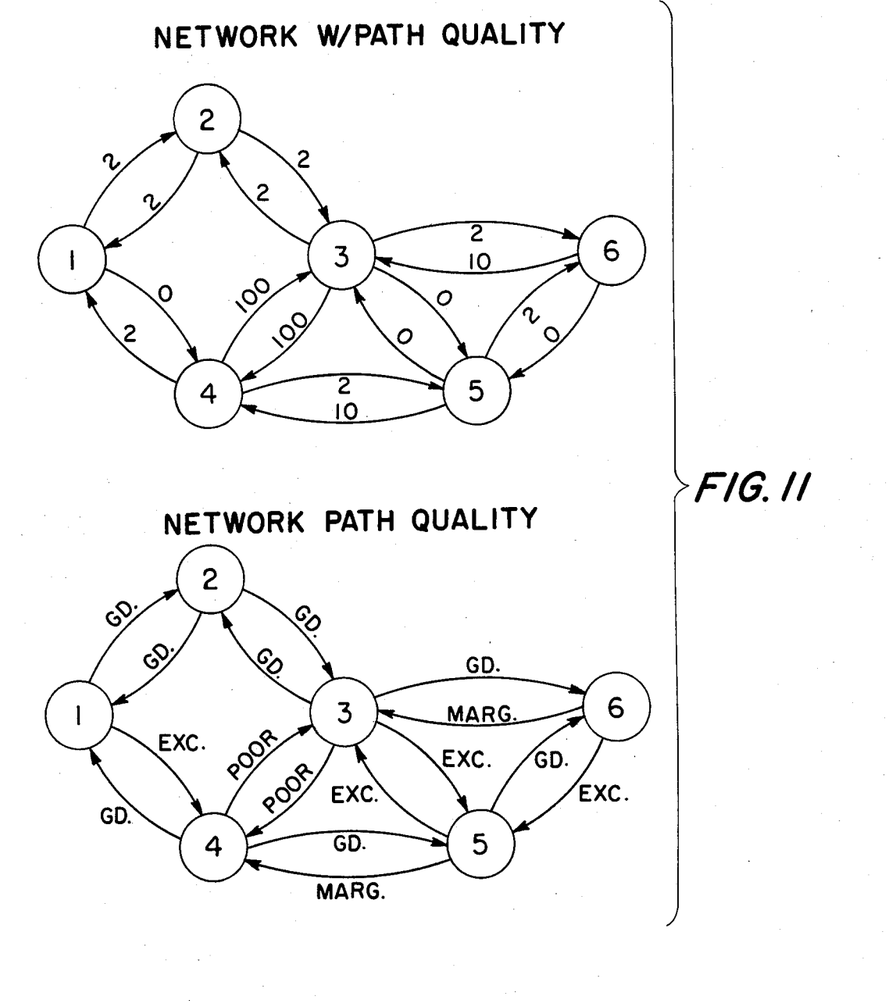
FIG. 11 is a diagram illustrative of a typical network with indications of path quality.

Referring jointly to FIGS. 3 and FIGS. 9, switch 124 will provide output identification of, from its point of view, central-to-central communication links which would be used directly in a conventional system. An example of the output indications of transmission quality evaluator 122 and the central-to-central links is depicted in FIG. 11. As will be seen, central-to-central links may have different transmission quality respectively in the transmitting and receiving directions. Switch 124 will be set for best transmission path quality in accordance with the FIG. 11 indications, either by an operator or dynamically as alluded to above.

In accordance with the invention, and particularly translator 300, such link determinations are now used for the TDM highway, where all systems transmissions are broadcast sequentially in different time slots with routing indications set forth in the respective time slots. Accordingly, as noted above, telephone communications between remote stations of the system are achieved on a circular broadcast zone basis, rather than through individual channels of central-to-central communication links. The operation of control unit 310 may be such that time slots on the TDM highway may follow any desired algrorithmic pattern, inclusive of adaptive patterns which take into account traffic congestion. The above-noted common coordinating channel of the packets on the TDM highway, i.e., a given time slot in each packet, will serve to coordinate this practice and otherwise provide for cross-exchange of control information within the system. Operation of the FIG. 10 reception translator 400 will be seen to the reverse of that transmission translator 300 of FIG. 9.

Various changes and modifications to the foregoing may be introduced without departing from the invention. Accordingly, the particularly disclosed preferred embodiment and practice is intended in an illustrative and not in a limiting sense. The true spirit and scope of the invention is set forth in the following claims.

I claim:

1. A communication system comprising:
   (a) a plurality of central stations each including an omnidirectional antenna, a transmitter, each such central station transmitter transmitting at a frequency different from all other such central station transmitters, each said central station further having receivers operating at the frequencies of the transmitters of other system central stations and at least one further receiver for a remote station assigned to such central station, said further receiver operating at the transmitting frequency of such remote station;
   (b) each said remote station including a directional antenna directed toward the central station to which such remote station is assigned and having a transmitter operating at a distinct transmitting frequency and a receiver operating at the frequency of its assigned central station transmitter; and
   (c) received signal quality evaluation means for each said central station for collectively indicating the transmission and reception quality of each central station-to-central station communication path provided by said omnidirectional antennas.

2. The system claimed in claim 1 wherein all said central station transmitters transmit a time division multiplexed group having a time slot which is a common coordinating channel for said central stations.

3. The system claimed in claim 2 wherein each said central station further includes switch means operable on the basis of such quality indication of said means (c) for establishing communication paths through said central stations between participating such remote stations of all of said central stations.

4. The system claimed in claim 3 wherein each said central station further includes translation means for assigning time slots in said time division multiplexed group in accordance with the communication paths established by said switch means.

5. The system claimed in claim 1 wherein each said means (c) includes control means for directing the transmitter of its central station to transmit transmission quality evaluation packets successively in preselected number and for determining the quality of transmission quality evaluation packets received from others of said central stations.

6. The system claimed in claim 5 wherein said control means is operative in such determination of the quality of such received transmission quality evaluation packets to provide output indication of transmission quality in one of plural quality levels.

7. The system claimed in claim 6 wherein said control means is operative in such determination of the quality of such received transmission quality evaluation packets to detect error rate therein.

8. The system claimed in claim 1 wherein each said means (c) includes control means for determining the quality of received transmissions of others of said central stations by detecting error rate therein.

9. A communication system comprising:

(a) a plurality of central stations each including an omnidirectional antenna, a transmitter, each such central station transmitter transmitting at a frequency different from all other such central station transmitters, each said central station further having receivers operating at the frequencies of the the transmitters of other system central stations and at least one further receiver for a remote station assigned to such central station, said further receiver operating at the transmitting frequency of such remote station;

(b) each said remote station including a directional antenna directed toward the central station to which such remote station is assigned and having a transmitter operating at a distinct transmitting frequency and a receiver operating at the frequency of its assigned central station transmitter; all said central station transmitters transmitting a time division multiplexed group having a time slot which is a common coordinating channel for said central stations.

10. The system claimed in claim 9 wherein each said central station further includes switch means for establishing communication paths between remote stations in said system and translation means for assigning time slots in said time division multiplexed group to said transmissions between remote stations correspondingly to said communication paths established by said switch means, whereby communication in said system is effected on a circular broadcast zone basis.

* * * * *